United States Patent
Zhang

(10) Patent No.: US 11,625,904 B2
(45) Date of Patent: Apr. 11, 2023

(54) METHOD AND ELECTRONIC DEVICE FOR PROCESSING IMAGES

(71) Applicant: BEIJING DAJIA INTERNET INFORMATION TECHNOLOGY CO., LTD., Beijing (CN)

(72) Inventor: Heng Zhang, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 133 days.

(21) Appl. No.: 17/193,925

(22) Filed: Mar. 5, 2021

(65) Prior Publication Data

US 2021/0374995 A1 Dec. 2, 2021

(30) Foreign Application Priority Data

Jun. 1, 2020 (CN) .......................... 202010485785.1

(51) Int. Cl.
*G06V 10/20* (2022.01)
*G06T 7/73* (2017.01)
*G06T 7/11* (2017.01)
*G06F 18/22* (2023.01)
*G06V 10/75* (2022.01)

(52) U.S. Cl.
CPC ............ *G06V 10/255* (2022.01); *G06F 18/22* (2023.01); *G06T 7/11* (2017.01); *G06T 7/75* (2017.01); *G06V 10/751* (2022.01); *G06T 2207/20081* (2013.01)

(58) Field of Classification Search
CPC ... G06T 2207/20081; G06T 7/11; G06T 7/75; G06K 9/6215
See application file for complete search history.

(56) References Cited

U.S. PATENT DOCUMENTS

| | | | |
|---|---|---|---|
| 7,450,122 B2* | 11/2008 | Petrovic | G06T 15/08 345/473 |
| 8,249,365 B1* | 8/2012 | Winnemoeller | G06T 11/40 382/181 |
| 10,515,456 B2* | 12/2019 | Aksit | G06V 10/7557 |
| 11,350,059 B1* | 5/2022 | Swierk | G06T 7/0002 |

(Continued)

FOREIGN PATENT DOCUMENTS

| | | | | |
|---|---|---|---|---|
| CN | 103606186 A | * | 2/2014 | ............. G06T 17/00 |
| CN | 114078179 A | * | 2/2022 | |

OTHER PUBLICATIONS

Patnaik, S. et al. "Automated Skin Disease Identification using Deep Learning Algorithm" Biomedical and Pharmacology Journal, Sep. 2018, vol. 11(3), pp. 1429-1436 (1-8).*

(Continued)

*Primary Examiner* — Mia M Thomas
(74) *Attorney, Agent, or Firm* — Kolitch Romano Dascenzo Gates LLC

(57) ABSTRACT

A method for processing images can include: acquiring a hair region in a first image; determining a hair direction parameter of a pixel point in the hair region by a hair direction prediction model based on the hair region; converting the hair direction parameter of the pixel point into a hair direction of the pixel point; and generating a second image by processing the hair region in the first image based on the hair direction of the pixel point.

19 Claims, 10 Drawing Sheets

(56) References Cited

U.S. PATENT DOCUMENTS

| | | |
|---|---|---|
| 11,403,789 B2* | 8/2022 | Ma .............................. G06T 5/50 |
| 11,410,344 B2* | 8/2022 | Qiu ......................... G06N 3/088 |
| 2013/0021460 A1* | 1/2013 | Burdoucci ............ B26B 19/388 |
| | | 382/103 |
| 2019/0051048 A1* | 2/2019 | Zhou ..................... G06K 9/6274 |
| 2019/0166980 A1* | 6/2019 | Huang ................... G06Q 30/02 |
| 2019/0355115 A1* | 11/2019 | Niebauer ................ G06N 20/00 |
| 2022/0058880 A1* | 2/2022 | Bondich ............... G06F 18/214 |

OTHER PUBLICATIONS

Shen, Y. et al. "InterFaceGAN: Interpreting the Disentangled Face Representation Learned by GANs" Computer Vision and Pattern Recognition, Oct. 2020, pp. 1-16.*

* cited by examiner

METHOD AND ELECTRONIC DEVICE FOR PROCESSING IMAGES

The present disclosure claims priority to Chinese Patent Application No. 202010485785.1, filed on Jun. 1, 2020, which is incorporated herein by reference in its entirety.

TECHNICAL FIELD

The present disclosure relates to the field of image processing technologies, and in particular relates to a method for processing images and an electronic device.

BACKGROUND

Currently, an electronic device generally is installed with a short video application or a camera application. A user can shoot images using these applications which support the addition of special effects to the images. For example, by these applications, the user can add a special effect about the hair direction to the user's hair to render a smooth-hair effect, such that the hair looks more beautiful and the user experience is improved.

SUMMARY

Embodiments of the present disclosure provide a method and an apparatus for processing images, and an electronic device and a storage medium thereof, which can improve the accuracy of predicting the hair direction.

According to an aspect of the embodiments of the present disclosure, a method for processing images is provided. The method is applicable to an electronic device.

The method includes: acquiring a hair region in a first image, wherein the hair region includes a region where the hair of a target object in the first image is located; determining a hair direction parameter of a pixel point in the hair region by a hair direction prediction model based on the hair region, wherein the hair direction parameter includes an angle of a hair direction of the pixel point relative to a horizontal line; converting the hair direction parameter of the pixel point into the hair direction of the pixel point; and generating a second image by processing the hair region in the first image based on the hair direction of the pixel point.

According to another aspect of the embodiments of the present disclosure, a method for training a hair direction prediction model is provided.

The method includes: acquiring a sample hair region; acquiring a hair direction of a pixel point in the sample hair region; converting the hair direction of the pixel point into a sample hair direction parameter of the pixel point; and training a hair direction prediction model based on the sample hair region and the sample hair direction parameter of the pixel point.

According to yet another aspect of the embodiments of the present disclosure, an electronic device is provided.

The electronic device includes: one or more processors; and a volatile or non-volatile memory configured to store one or more computer programs including one or more instructions executable by the one or more processors; wherein the one or more instructions, when loaded and run by the one or more processors, cause the one or more processors to perform a method including:

acquiring a hair region in a first image, wherein the hair region includes a region where the hair of a target object in the first image is located; determining a hair direction parameter of a pixel point in the hair region by a hair direction prediction model based on the hair region, wherein the hair direction parameter includes an angle of a hair direction of the pixel point relative to a horizontal line; converting the hair direction parameter of the pixel point into the hair direction of the pixel point; and generating a second image by processing the hair region in the first image based on the hair direction of the pixel point.

According to still another aspect of the embodiments of the present disclosure, a non-transitory computer-readable storage medium is provided. The storage medium stores one or more computer programs including one or more instructions therein. The one or more instructions, when loaded and executed by one or more processors of an electronic device, cause the electronic device to perform a method including: acquiring a hair region in a first image, wherein the hair region includes a region where the hair of a target object in the first image is located; determining a hair direction parameter of a pixel point in the hair region by a hair direction prediction model based on the hair region, wherein the hair direction parameter includes an angle of a hair direction of the pixel point relative to a horizontal line; converting the hair direction parameter of the pixel point into the hair direction of the pixel point; and generating a second image by processing the hair region in the first image based on the hair direction of the pixel point.

According to still another aspect of the embodiments of the present disclosure, an application is provided. The application includes one or more instructions. The one or more instructions, when loaded and executed by one or more processors of an electronic device, cause the electronic device to perform a method including: acquiring a hair region in a first image, wherein the hair region includes a region where the hair of a target object in the first image is located; determining a hair direction parameter of a pixel point in the hair region by a hair direction prediction model based on the hair region, wherein the hair direction parameter includes an angle of a hair direction of the pixel point relative to a horizontal line; converting the hair direction parameter of the pixel point into the hair direction of the pixel point; and generating a second image by processing the hair region in the first image based on the hair direction of the pixel point.

It should be understood that the above general descriptions and the following detail descriptions are only exemplary and explanatory, and cannot limit the present disclosure.

BRIEF DESCRIPTION OF THE DRAWINGS

The accompanying drawings, which are incorporated in and constitute a part of the description, illustrate embodiments in conformity with the present disclosure and, together with the description, serve to explain the principles of the present disclosure.

DETAILED DESCRIPTION

Exemplary embodiments will be described in detail herein, examples of which are illustrated in the accompanying drawings. The following description refers to the accompanying drawings in which the same numbers in different drawings represent the same or similar elements unless otherwise indicated. The implementations set forth in the following exemplary embodiments do not represent all implementations consistent with the present disclosure. Rather, they are merely examples of apparatuses and methods consistent with certain aspects of the present disclosure as detailed in the appended claims.

Figure 1:
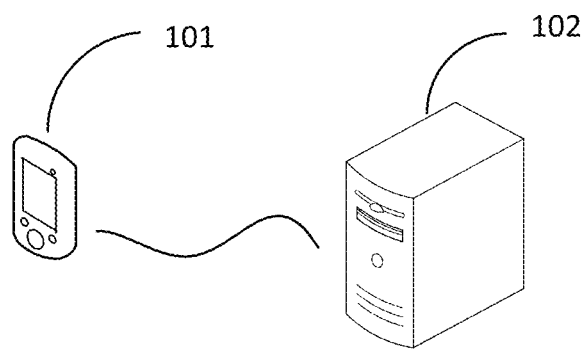
FIG. 1 is a schematic diagram illustrating an implementation environment for processing images according to an exemplary embodiment of the present disclosure.

FIG. 1 illustrates an implementation environment for processing images according to an exemplary embodiment of the present disclosure. The implementation environment includes: an electronic device 101 and a server 102. A target application is installed on the electronic device 101, and the server 102 is a server 102 corresponding to the target application. The electronic device 101 and the server 102 may be connected in a wireless or wired manner. The target application may be a short video application or a camera application, which is not specifically limited in the embodiment of the present disclosure. The target object may shoot an image using the target application, and the target application is capable of adding a special effect to the image. For example, the special effect is used for changing a hair direction. By adding the special effect to the image, a smooth-hair effect may be rendered to make the hair look more beautiful, thereby improving user experience. The target object may be a person or an animal, which is not specifically limited in the embodiment of the present disclosure.

In some embodiments, the timing for the electronic device 101 to add the special effect to the hair of the target object may be set and altered as needed, which is not specifically limited in the embodiment of the present disclosure. For example, when the target object enters a shooting screen of the target application, the electronic device 101 adds the special effect to the hair of the target object. For another example, when the target object shoots an image using the target application, the electronic device 101 adds the special effect to the hair of the target object, and then displays an image with the special effect. For another example, when a preset virtual button in the target application is triggered, the electronic device 101 adds the special effect to the hair of the target object.

The method according to the embodiment of the present disclosure is not limited by the number of set preset directions, and the prediction is more accurate and the speed is faster. In addition, the processing speed may not be affected by the area of the hair region, and the method can be performed on various types of electronic devices 101 in real time. Furthermore, the method according to the embodiment of the present disclosure can directly predict the hair direction in a spatial domain without a need of conversion, and the prediction efficiency is high.

Figure 2A:
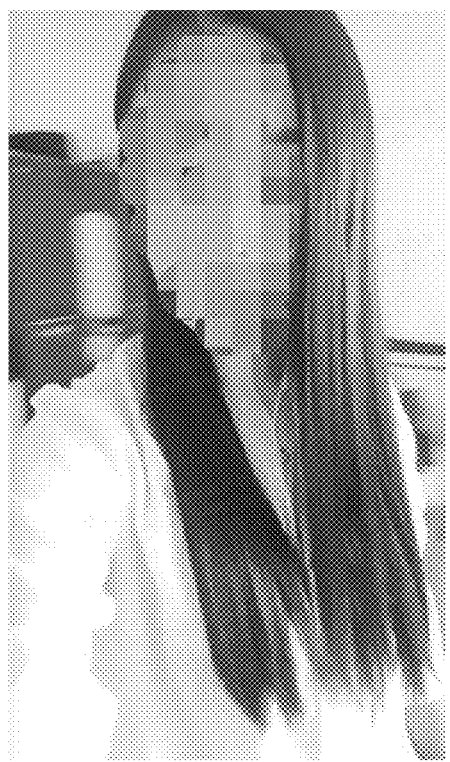
FIG. 2A is a schematic diagram of an image of a target object with no special effect.
Figure 2B:
FIG. 2B is a schematic diagram of an image with a special effect for changing a hair direction added to hair of a target object according to the related art.
Figure 2C:
FIG. 2C is a schematic diagram of an image with a special effect for changing a hair direction added to hair of a target object according to the method according to embodiments of the present disclosure.

Referring to FIG. 2A-FIG. 2C, the image in FIG. 2A is an image with no special effect added, the image in FIG. 2B is an image with a special effect added to the hair of the target object according to the related art, and the image in FIG. 2C is an image with a special effect added to the hair of the target object according to the method according to the embodiments of the present disclosure. As seen from these images, compared to the special effect in the second figure, the special effect in the third figure is closer to an actual hair direction of the target object. Therefore, the method according to the embodiment of the present disclosure can predict the hair direction more accurately than the related art.

The embodiments of the present disclosure may be applied to various scenarios.

In some embodiments, in the scenario of a live streaming, the electronic device acquires a live streaming video, the live streaming video includes a plurality of live streaming screen images, and each live streaming screen image includes the hair region of an anchor. The method according to the embodiment of the present disclosure may be employed to process the hair region in each live streaming screen image, so as to beautify the live streaming video and improve a live streaming effect. In addition, as the position or direction of the hair region of the anchor in the live streaming video changes, the determined direction of the hair region changes accordingly, such that the changed hair region can be processed continuously.

In some embodiments, in the scenario of taking a photo, when the electronic device takes a certain photo, the method according to the embodiment of the present disclosure may be configured to process the hair region in the photo, so as to beautify the photo.

In some embodiments, in the scenario of shooting a short video, when the electronic device shoots the short video, the method according to the embodiment of the present disclosure may be employed to process the hair region in a plurality of video frames in the short video, so as to beautify the short video.

Figure 3:
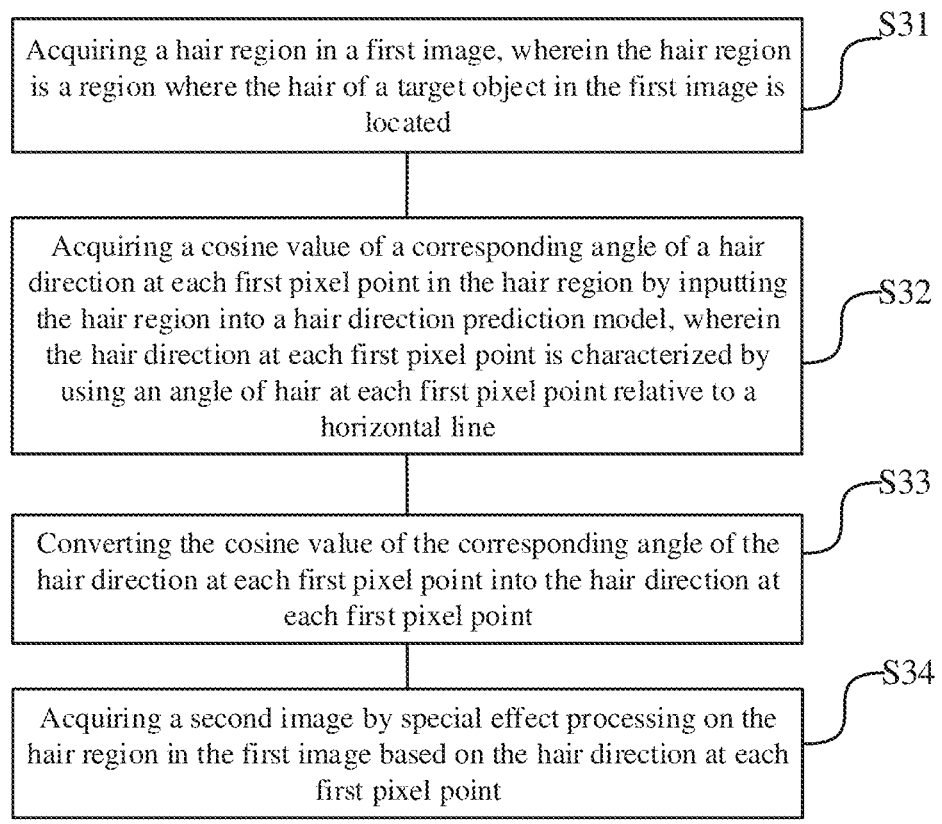
FIG. 3 is a flowchart illustrating a method for processing images according to an exemplary embodiment of the present disclosure.

FIG. 3 is a flowchart illustrating a method for processing images according to an exemplary embodiment. The method is applied to an electronic device. As shown in FIG. 3, the method includes the following steps:

In S31, the electronic device acquires a hair region in a first image, wherein the hair region includes a region where the hair of a target object in the first image is located.

In S32, the electronic device acquires a cosine value of a corresponding angle of a hair direction of each first pixel point in the hair region.

In some embodiments, the cosine value may be acquired by inputting the hair region into a hair direction prediction model, wherein the hair direction of each first pixel point is characterized by an angle of hair at each first pixel point relative to a horizontal line.

The cosine value of the corresponding angle of the hair direction of the first pixel point is a hair direction parameter at the first pixel point. S32 is to determine the hair direction parameter of the pixel point in the hair region by the hair direction prediction model based on the hair region, wherein the hair direction parameter includes an angle of the hair direction of the pixel point relative to the horizontal line.

The hair direction prediction model may be trained by the electronic device 101, or may be trained the server 102. When the model is a model trained by the server 102, the electronic device 101 may acquire the model trained by the server 102, which is not specifically limited in the embodiment of the present disclosure.

In S33, the electronic device converts the cosine value of the corresponding angle of the hair direction of each first pixel point into the hair direction of each first pixel point. In some embodiments, the hair direction parameter of the pixel point is converted into the hair direction of the pixel point.

In S34, the electronic device acquires a second image by image processing on the hair region in the first image based on the hair direction of each first pixel point. In some embodiments, the second image is generated by processing the hair region in the first image based on the hair direction of the pixel point.

In some embodiments, before inputting the hair region into the hair direction prediction model, the method further includes: acquiring a sample hair region; acquiring a hair direction of each second pixel point in the sample hair region; converting the hair direction of each second pixel point into a sample cosine value of a corresponding angle of the hair direction of each second pixel point; and acquiring a hair direction prediction model by model training based on the sample hair region and the sample cosine value of the corresponding angle of the hair direction of each second pixel point in the sample hair region.

The sample cosine value of the corresponding angle of the hair direction of the pixel point is a sample hair direction parameter at the pixel point. That is, the sample hair region is acquired; the hair direction of the pixel point in the sample hair region is acquired; the hair direction of the pixel point is converted into the sample hair direction parameter of the pixel point; and the hair direction prediction model is trained based on the sample hair region and the sample hair direction parameter of the pixel point.

In some embodiments, acquiring the hair direction of each second pixel point in the sample hair region includes: converting the sample hair region from a current spatial domain to a frequency domain; for each second pixel point, in the frequency domain, determining a similarity between the hair direction of the second pixel point in the sample hair region and each preset direction; and characterizing the hair direction of the second pixel point by using the preset direction with a largest similarity.

Specifically, the sample hair region is converted from the current spatial domain to the frequency domain; in the frequency domain, the similarity between the hair direction of the pixel point in the sample hair region and each preset direction is determined; and the hair direction of the pixel point is determined based on the preset direction with the largest similarity.

In some embodiments, acquiring the hair direction of each second pixel point in the sample hair region includes: acquiring tag information of a labeled sample hair region; and acquiring the hair direction of each second pixel point in the sample hair region from the tag information, that is, acquiring the hair direction of the pixel point in the sample hair region based on the tag information.

In some embodiments, converting the cosine value of the corresponding angle of the hair direction of each first pixel point into the hair direction of each first pixel point includes: for each first pixel point, acquiring an angle of the hair direction of the first pixel point by performing an inverse function operation on the cosine value of the corresponding angle of the hair direction of the first pixel point; and characterizing the hair direction of the first pixel point by using the angle of the hair direction of the first pixel point.

The cosine value of the corresponding angle of the hair direction of the first pixel point is a hair direction parameter of the first pixel point, and the angle of the hair direction of the first pixel point is an angle of the hair direction of the first pixel point relative to a horizontal line. That is, the angle of the hair direction of the pixel point relative to the horizontal line is determined based on the hair direction parameter of the pixel point; and the hair direction of the pixel point is determined based on the angle.

In some embodiments, acquiring the second image by image processing on the hair region in the first image based on the hair direction of each first pixel point includes: determining a direction of the hair region based on the hair direction of each first pixel point; and acquiring the second image by mapping the hair region with a direction back to the first image based on a position of the hair region in the first image, that is, generating the second image by mapping the hair region to the first image based on the position of the hair region in the first image.

In some embodiments, acquiring the hair region in the first image includes: acquiring the first image, acquiring a region of interest (ROI) by inputting the first image into a hair segmentation network, and acquiring the hair region by clipping the ROI out from the first image.

That is, the first image is acquired, and the ROI in the first image is determined using the hair segmentation network; and the hair region is acquired by segmenting the ROI from the first image.

Figure 4:
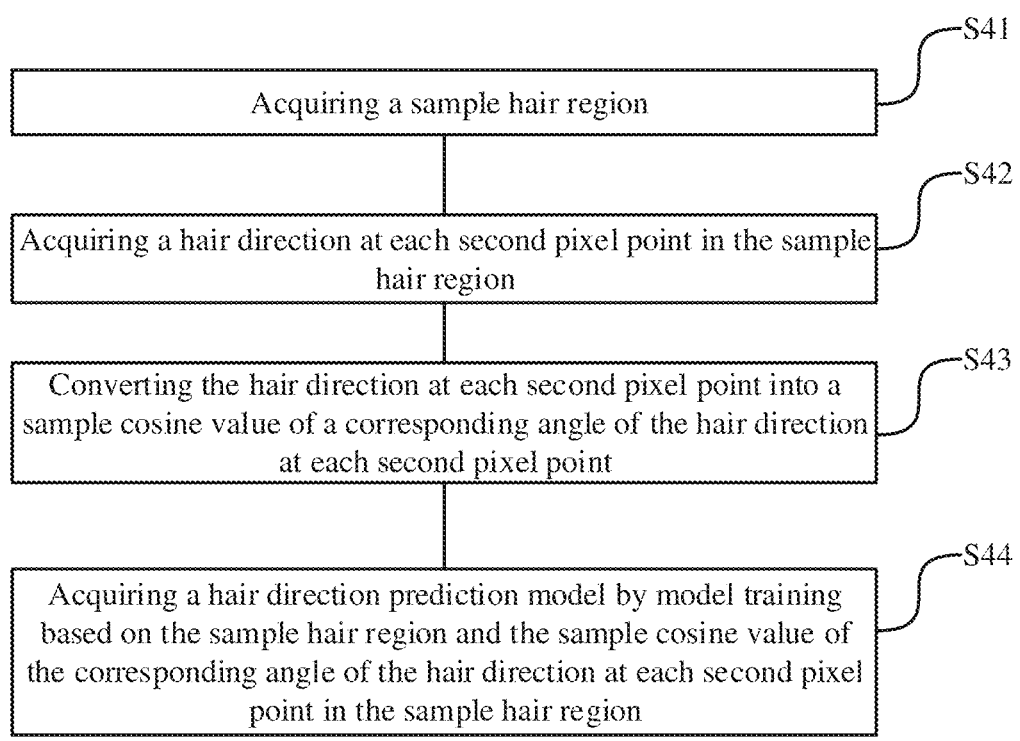
FIG. 4 is a flowchart illustrating a method for training a hair direction prediction model according to an exemplary embodiment according to the present disclosure.

FIG. 4 is a flowchart illustrating a method for training a hair direction prediction model according to an exemplary embodiment of the present disclosure. The method is applicable to an electronic device. As shown in FIG. 4, the method includes the following steps:

In S41, the electronic device acquires sample hair region.

In some embodiments, the electronic device may acquire the sample hair region from a sample image. In some embodiments, the electronic device may directly acquire the sample hair region, which is not specifically limited in the embodiment of the present disclosure.

When the electronic device acquires the sample hair region from the sample image, the process may include: acquiring the sample image, acquiring the ROI by inputting the sample image into the hair segmentation network, and acquiring the sample hair region clipping the ROI out from the sample image.

Specifically, the ROI in the sample image is determined using the hair segmentation network, and the sample hair region is acquired by segmenting the ROI from the sample image.

The hair segmentation network is a network configured to segment hair. For any image, the hair region may be segmented from the image by inputting the image into the hair segmentation network, and processing the image using the hair segmentation network.

In some embodiments, the hair of the target object in the sample hair region may be long hair or short hair. In some embodiments, a hair length of the target object in the sample hair region is greater than a preset length, that is, the electronic device firstly determines the hair length of the target object in the sample image, and determines whether the sample hair region is acquired according to a relationship between the hair length and the preset length. For example, if the hair length of the target object is not less than the preset length, the sample hair region in the sample image is acquired. If the hair length of the target object is less than the preset length, the sample hair region is not acquired.

The preset length may be set and altered as needed, which is not specifically limited in the embodiment of the present disclosure. For example, the preset length is 15 cm or 20 cm. The hair segmentation network may be selected and altered as needed, which is not specifically limited in the embodiment of the present disclosure. The number of sample images or the number of sample hair regions may also be set and altered as needed, which is not specifically limited in the embodiment of the present disclosure.

In S42, the electronic device acquires a hair direction of each second pixel point in the sample hair region.

For each second pixel point, the hair direction of the second pixel point is characterized by an angle of the hair at the second pixel point relative to a horizontal line.

The hair direction of each second pixel point may be acquired in any of the following two ways, which is not specifically limited in the embodiment of the present disclosure.

In the first way, acquiring the hair direction of each second pixel point in the sample hair region may be performed by following operations:

(A1) The sample hair region is converted from a current spatial domain to a frequency domain.

In some embodiments, the electronic device may convert the sample hair region from the spatial domain to the frequency domain by a Fourier transform.

(A2) For each second pixel point, in the frequency domain, a similarity between the hair direction of the second pixel point in the sample hair region and each preset direction is determined.

The sample hair region is a combination of sine waves or cosine waves of different frequencies in the frequency domain. For each second pixel point, the electronic device determines the direction of the second pixel point at the position according to the position of the second pixel point on the sine wave or cosine wave, and uses the direction as the hair direction of the second pixel point.

The electronic device calculates the similarity between the hair direction of the second pixel point and each preset direction and acquires the similarity between the hair direction and each preset direction.

The number of preset directions may be set and altered as needed, which is not specifically limited in the embodiment of the present disclosure.

In (A2), in the frequency domain, the similarity between the hair direction of the pixel point in the sample hair region and each preset direction is determined.

(A3) The hair direction of the second pixel point is characterized by using the preset direction with a largest similarity.

The greater the similarity between the hair direction of the second pixel point and the preset direction is, the closer the preset direction is to the hair direction of the second pixel point. In some embodiments, for each second pixel point, the electronic device selects the preset direction with the largest similarity of the hair direction of the second pixel point from a plurality of preset directions, and uses the preset direction to characterize the hair direction of the second pixel point.

In (A3), the hair direction of the pixel point is determined based on the preset direction with the largest similarity.

In the second way, acquiring the hair direction of each second pixel point in the sample hair region may be performed by following operations:

(B1) Tag information of a labeled sample hair region is acquired.

The tag information includes the hair direction of each second pixel point in the sample hair region.

In some embodiments, the electronic device may acquire the tag information of the sample hair region corresponding to a sample identifier from a database according to the sample identifier. Different sample hair regions correspond to different sample identifiers.

In some embodiments, the electronic device acquires the tag information based on a corresponding relationship established between the sample identifier and the tag information of the sample hair region. The corresponding relationship is stored in the database. In response to receiving an acquisition instruction, the electronic device acquires the tag information of the sample hair region.

It should be noted that, in this embodiment, the hair direction of each second pixel point in the sample hair region in the tag information may be manually labeled.

(B2) The hair direction of each second pixel point in the sample hair region is acquired from the tag information.

The electronic device acquires the hair direction of each second pixel point in the sample hair region included in the tag information. That is, the hair direction of the pixel point in the sample hair region is acquired based on the tag information.

It should be further explained that in the embodiment of the present disclosure, the electronic device may quickly acquire a large amount of training data by the first way, and the calculation cost is smaller. The electronic device may acquire more accurate training data with higher quality by the second way.

In S43, the electronic device converts the hair direction of each second pixel point into a sample cosine value of a corresponding angle of the hair direction of each second pixel point.

For each second pixel point, since the hair direction of the second pixel point is characterized by the angle of the hair at the second pixel point relative to the horizontal line, based on this, the electronic device may determine the angle between the hair at the second pixel point and the horizontal line, perform cosine calculation on the hair angle, and acquire the sample cosine value corresponding thereto. The range of the angle t is $0° \leq t \leq 180°$.

The sample cosine value of the corresponding angle of the hair direction of the pixel point is a sample hair direction parameter of the pixel point. In S43, the hair direction of the pixel point is converted into the sample hair direction parameter of the pixel point.

In S44, the electronic device acquires a hair direction prediction model by model training based on the sample hair region and the sample cosine value of the corresponding angle of the hair direction of each second pixel point in the sample hair region.

In some embodiments, the electronic device acquires a training cosine value of the corresponding angle of the hair direction of each second pixel point in the sample hair region by inputting the sample hair region into an initial model. The electronic device compares the training cosine value with the sample cosine value. When the difference between the training cosine value and the sample cosine value is within a preset difference range, the electronic device acquires the hair direction prediction model. When the difference between the training cosine value and the sample cosine value is not within the preset difference range, the electronic device adjusts model parameters in the initial model, so as to adjust the training cosine value, and further to determine the difference between the adjusted training cosine value and the sample cosine value, and iteratively until the difference between the training cosine value and the sample cosine value is within the preset difference range, and the hair direction prediction model is acquired.

The training cosine value of the corresponding angle of the hair direction of each second pixel point is the training hair direction parameter at each second pixel point. In S44, the hair direction prediction model is trained based on the sample hair region and the sample hair direction parameter of the pixel point.

Specifically, the electronic device processes the sample hair region by the initial model, and acquires the training hair direction parameter at each second pixel point in the sample hair region. The electronic device compares the training hair direction parameter with the sample hair direction parameter. When the difference between the training hair direction parameter and the sample hair direction parameter is within a preset difference range, the electronic device acquires the hair direction prediction model. When the difference between the training hair direction parameter and the sample hair direction parameter is not within the preset difference range, the electronic device adjusts the model parameters in the initial model, so as to adjust the training hair direction parameter, and further to determine the difference between the adjusted training hair direction parameter and the sample hair direction parameter, and iteratively, until the difference between the training hair direction parameter and the sample hair direction parameter is within the preset difference range, and the hair direction prediction model is acquired.

In some embodiments, the electronic device may back-transmit the difference between the training cosine value and the sample cosine value in a gradient descent method, which is not specifically limited in the embodiment of the present disclosure.

It should be noted that after performing S44, the electronic device may directly acquire the hair direction prediction model, and directly perform hair direction prediction on an image to be processed in response to an image processing instruction. In some embodiments, after performing S44, the electronic device may directly acquire the hair direction prediction model, and in response to the image processing instruction, the hair direction prediction model is tested at first, and when the test is successful, the hair direction prediction is performed on the image to be processed. In some embodiments, after performing S44, the hair direction prediction model is tested, and when the test is successful, the hair direction prediction is performed on the image to be processed in response to receiving an image processing instruction, which is not specifically limited in the embodiment of the present disclosure.

Since by the method for training the hair direction prediction model according to the embodiment of the present disclosure, the prediction model is trained based on the hair sample region and the sample cosine value of the corresponding angle of the hair direction of each second pixel point in the sample hair region, which is not limited by the number of preset directions, and thus the prediction is more accurate and the speed is faster.

In addition, the hair direction prediction model according to the embodiment of the present disclosure is more accurate, does not depend on the area of the hair region, and can be processed on various types of electronic devices in real time.

Figure 5:
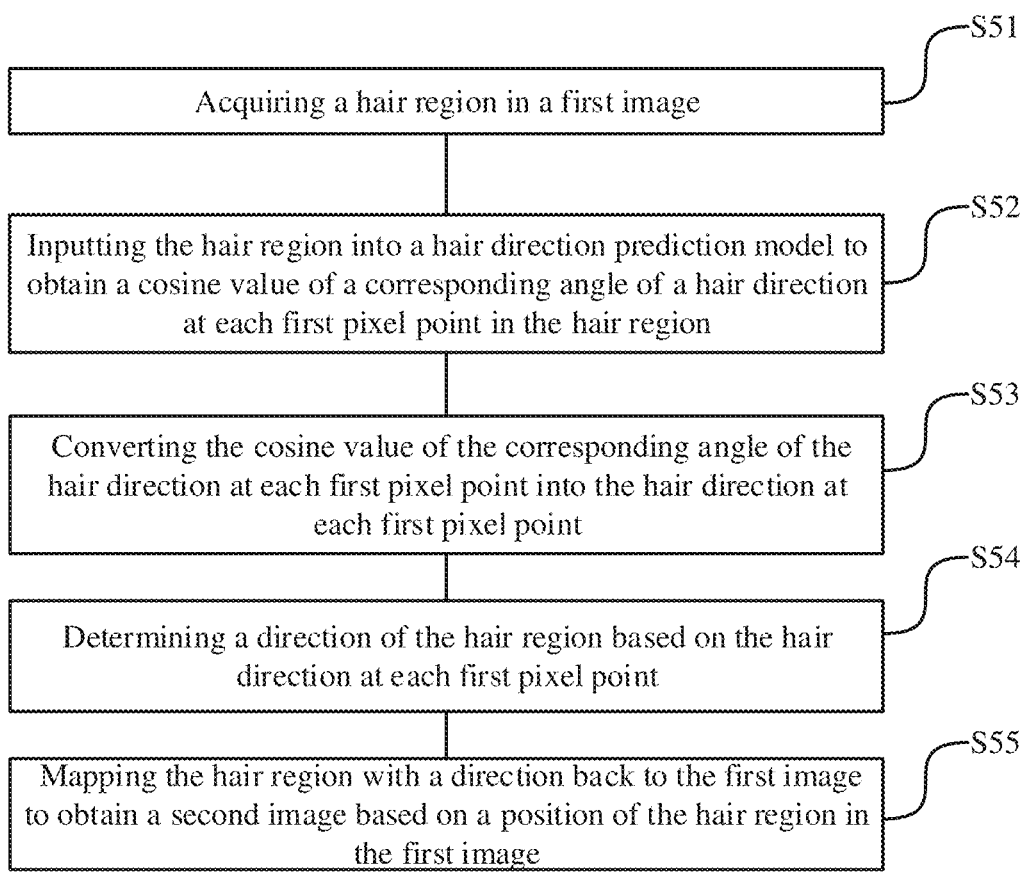
FIG. 5 is a flowchart illustrating a method for processing images according to an exemplary embodiment of the present disclosure.

FIG. 5 is a flowchart illustrating a method for processing images according to an exemplary embodiment of the present disclosure. The method is applicable to an electronic device. As shown in FIG. 5, the method includes the following steps:

In S51, the electronic device acquires a hair region in a first image.

The hair region includes a region where hair of a target object in the first image is located.

The first image may be an image acquired by shooting after the shooting button in a target application is triggered. At this time, the electronic device may add a special effect to the hair of the target object in the image before displaying the image to the target object, wherein the special effect is used for changing a hair direction. The first image may also be an image acquired when the shooting button is not triggered after a camera module in the target application is activated, that is, the image in a viewfinder frame. At this time, the electronic device may add this special effect to the hair of the target object in the image. In addition, the special effect changes with the hair of the target object in the case that the hair of the target object moves or changes when the head of the target object moves or changes.

In some embodiments, the electronic device may acquire the first image, acquire an ROI by inputting the first image into a hair segmentation network, and acquire the hair region by clipping the ROI out from the first image. That is, the ROI in the first image is determined using the hair segmentation network, and the hair region is acquired by segmenting the ROI from the first image. This step is similar to acquiring the sample hair region by the electronic device according to the sample image in S41, and is not repeated herein.

Figure 6:
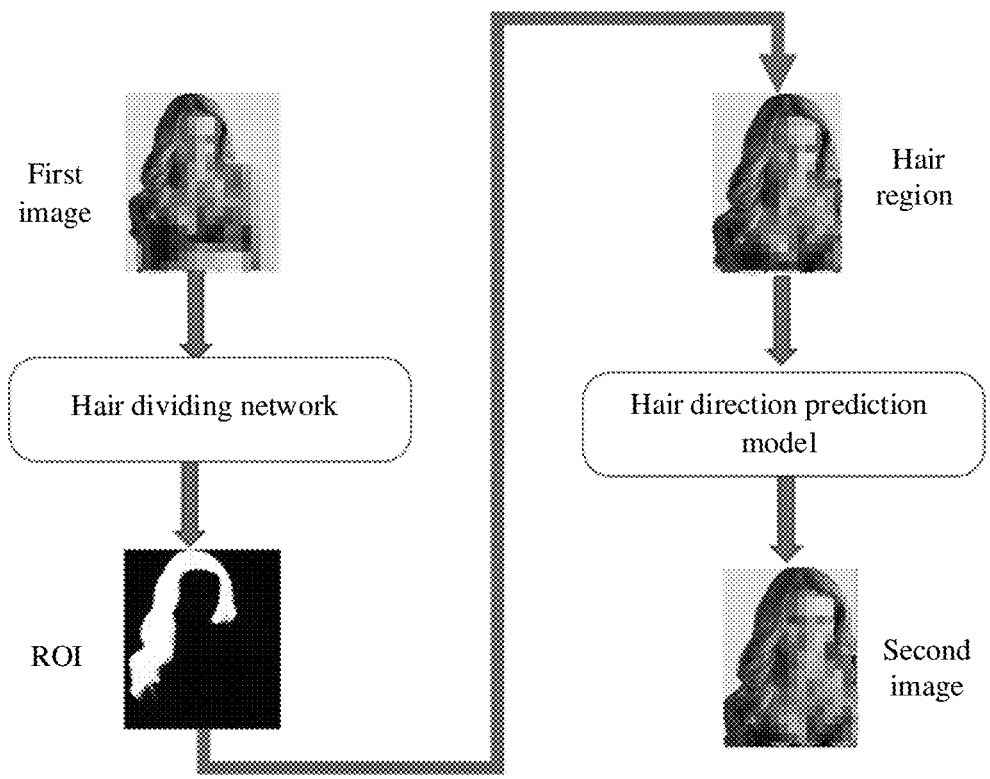
FIG. 6 is a schematic diagram illustrating a method for processing images according to an exemplary embodiment of the present disclosure.

Referring to FIG. 6, FIG. 6 is a schematic diagram of a method for processing images according to an embodiment of the present disclosure. It can be seen from FIG. 6 that the electronic device acquires the first image, acquires a white ROI in the figure by inputting the first image into the hair segmentation network, and then acquires the hair region by clipping the ROI out from the first image.

In some embodiments, the timing for the electronic device to acquire the hair region in the first image may be set and altered as needed, which is not specifically limited in the embodiment of the present disclosure. For example, the electronic device may generate a trigger instruction when a preset virtual button in the target application is triggered, and acquire a hair region in response to the trigger instruction, so as to subsequently add the special effect to the hair of the target object. For another example, the electronic device may also acquire the hair region when the hair of the target object is unwound and not tied up by a headband, so as to subsequently add the special effect. For another example, the electronic device may also acquire the viewing history of a user. When the user has just viewed a short video about the special effect and enters a shooting interface of the target application, the hair region is acquired, such that the special effect is added subsequently.

In some embodiments, acquiring the hair region in the first image includes: acquiring the hair region in the first image in response to detecting that the hair of the target object is unwound; or acquiring the hair region in the first image in response to entering the shooting interface after a video about the special effect is viewed; or acquiring the hair region in the first image in response to receiving the trigger instruction generated when the preset virtual button is triggered.

In the embodiment of the present disclosure, the electronic device may acquire the hair region in different scenarios, which increases the application scenarios of image processing and expands the application range of image processing.

In S52, the electronic device acquires a cosine value of a corresponding angle of a hair direction of each first pixel point in the hair region by inputting the hair region into a hair direction prediction model.

In some embodiments, the electronic device may acquire the cosine value of the corresponding angle of the hair direction of each first pixel point in the hair region by inputting the hair region into the hair direction prediction model. The hair direction of each first pixel point is characterized by an angle of the hair at each first pixel point relative to a horizontal line.

The cosine value of the corresponding angle of the hair direction of each first pixel point is a hair direction parameter at each first pixel point. S52 is to determine the hair direction parameter of the pixel point in the hair region by the hair direction prediction model based on the hair region. The hair direction parameter includes an angle of the hair direction of the pixel point relative to the horizontal line.

In S53, the electronic device converts the cosine value of the corresponding angle of the hair direction of each first pixel point into the hair direction of each first pixel point. In some embodiments, the hair direction parameter of the pixel point is converted into the hair direction of the pixel point.

In some embodiments, converting the cosine value the corresponding angle of the hair direction of each first pixel point into the hair direction of each first pixel point may be performed by following operations:

(1) The angle of the hair direction of the first pixel point is acquired by performing an inverse function operation on the cosine value of the corresponding angle of the hair direction of the first pixel point for each first pixel point.

In some embodiments, for each first pixel point, the electronic device performs inverse cosine function operation on the cosine value of the corresponding angle of the hair direction of the first pixel point, and acquires the angle corresponding thereto.

For example, cos α=A, that is, α=arccos A, wherein A is the cosine value of the corresponding angle of the hair direction of the first pixel point, and α is the angle of the hair direction of the first pixel point. The electronic device performs the inverse function operation on A, and acquires α.

(2) The hair direction of the first pixel point is characterized by the angle of the hair direction of at the first pixel point.

The angle of the hair direction of the first pixel point is an angle between the hair and the horizontal line, and the hair direction of the first pixel point may be characterized by this angle.

In (1) and (2), the angle of the hair direction of the pixel point relative to the horizontal line is determined based on the hair direction parameter of the pixel point, and the hair direction of the pixel point is determined based on the above angle.

In S54, the electronic device determines a direction of the hair region based on the hair direction of each first pixel point.

In some embodiments, the electronic device may acquire the position of each first pixel point in the hair region, and sequentially connect, according to the position of each first pixel point in the hair region, the hair directions at two adjacent first pixel points and finally obtain the direction of the hair region.

In S55, the electronic device maps the hair region with a direction back to the first image to obtain a second image based on a position of the hair region in the first image. In some embodiments, by mapping the hair region to the first image based on the position of the hair region in the first image, the second image is generated.

In some embodiments, the electronic device may acquire the second image by remapping the hair region with a direction back to the position of an original hair region in the first image according to the position of the acquired hair region in the first image. The second image exhibits the special effect.

In some embodiments, the position of the hair region in the first image is coordinates of the hair region in the first image, and the electronic device remaps the hair region with a direction back to the coordinates corresponding to the original hair region by coordinate conversion according to the coordinates of the hair region in the first image, thereby acquiring the second image.

In some embodiments, the timing for the electronic device to acquire the position of the hair region in the first image may be set and altered as needed, which is not specifically limited in the embodiment of the present disclosure. For example, when acquiring the hair region in the first image, the electronic device acquires the position of the hair region in the first image.

Still referring to FIG. 6, it can be seen from FIG. 6 that the electronic device acquires the cosine value of the corresponding angle of the hair direction of each first pixel point by inputting the hair region into the hair direction prediction model, and then converts the cosine value to the hair direction, which is finally mapped back to the first image. In this case, an output result is acquired, i.e., the second image.

Figure 7A:
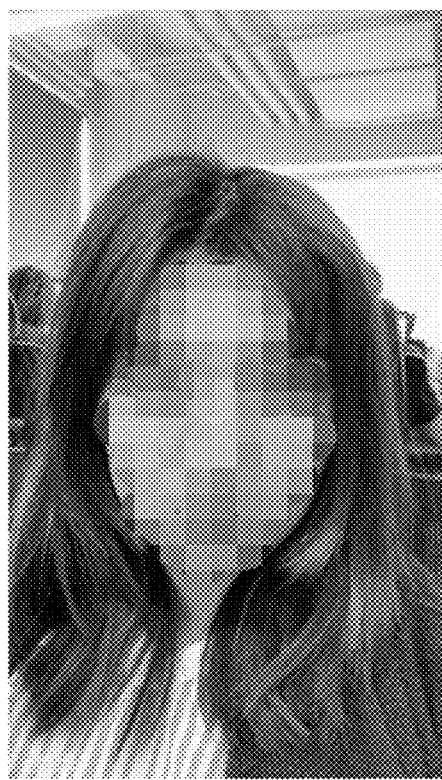
FIG. 7A is a schematic diagram of a first image according to an exemplary embodiment of the present disclosure.
Figure 7B:
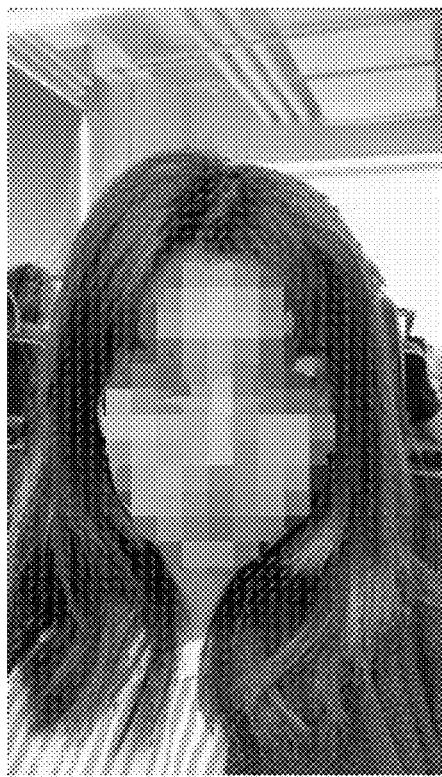
FIG. 7B is a schematic diagram of a second image obtained when a special effect for changing a hair direction is added to hair of a target object according to an exemplary embodiment of the present disclosure.
Figure 7C:
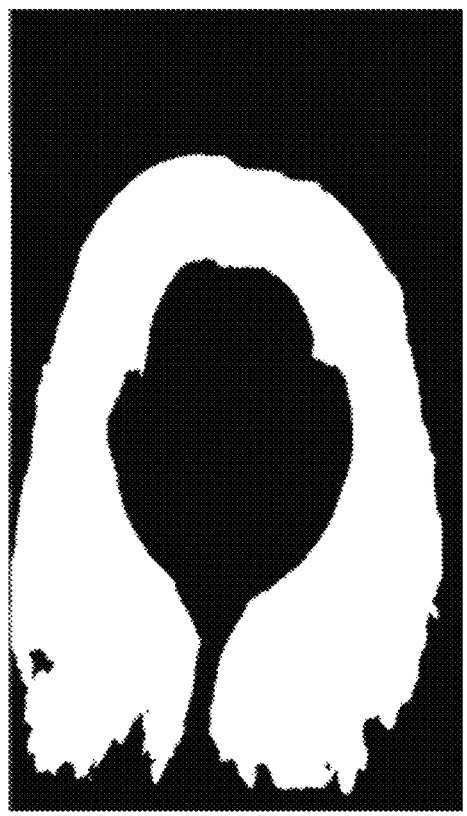
FIG. 7C is a schematic diagram of a region of interest (ROI) of the first image according to an exemplary embodiment of the present disclosure.

Referring to FIG. 7A-FIG. 7C, the image in FIG. 7A is the first image, and the image in FIG. 7B is the second image obtained according to the method according to the embodiment of the present disclosure. In the image in FIG. 7B, the special effect is added to the hair of the target object. The white region in the image in FIG. 7C is the ROI acquired by inputting the first image into the hair segmentation network. As seen from these images, the method according to the embodiment of the present disclosure can accurately predict the hair direction of the target object.

In some embodiments, when the electronic device adds the special effect to the hair of the target object, whether the virtual buttons corresponding to other functions in the target application are triggered can be determined. When the virtual button corresponding to any function is triggered, a trigger instruction is generated. In response to the trigger instruction, the electronic device also performs the operation corresponding to the triggered virtual button while adding special effect to the hair of the target object, that is, when the electronic device performs S55.

In some embodiments, when the virtual button corresponding to a beautifying function is triggered, the trigger instruction is generated. In response to the trigger instruction, the electronic device performs the beautifying function on the target object while adding the special effect to the hair of the target object. Therefore, in the obtained the second image, the special effect can be displayed on the hair of the target object, and the target object after beautifying can also be displayed, which not only enables the hair of the target object to look brighter, but also improves the comfort of the target object. For another example, when the virtual button corresponding to a hair color function is triggered, the trigger instruction is generated. In response to the trigger instruction, the electronic device changes the hair color while adding the special effect to the hair of the target object. Therefore, in the acquired second image, the special effect can be displayed on the hair of the target object, and the effect of changing the hair of the target object with other colors can also be displayed, which not only enables the hair of the target object to look more beautiful, but also allows the target object to experience the hair of different colors, thereby increasing use pleasure of the target object. For another example, when the virtual button corresponding to a face-lifting function is triggered, the trigger instruction is generated. In response to the trigger instruction, the electronic device performs face-lifting operation on the face of the target object while adding the special effect to the hair of the target object. Therefore, in the acquired second image, the special effect can be displayed on the hair of the target object, and the target object after face-lifting can also be displayed, which not only enables the hair of the target object to look more beautiful, but also improves use experience of the target object.

In some embodiments, the electronic device may also generate the trigger instruction corresponding to the triggered virtual button when the virtual buttons corresponding to other functions are triggered after performing S55, and perform the operation corresponding to the triggered virtual button in response to the trigger instruction. In some embodiments, when the virtual buttons corresponding to other functions are triggered, the electronic device generates the trigger instruction corresponding to the triggered virtual button, firstly performs the operation corresponding to the triggered virtual button in response to the trigger instruction, and then performs S51 in response to receiving the image processing instruction, which is not specifically limited in the embodiment of the present disclosure. The image processing instruction is intended to instruct to add the special effect to the hair region. In some embodiments, the image processing instruction is generated when the virtual button of adding the special effect is triggered, or generated at other timings.

In the embodiment of the present disclosure, the electronic device combines the addition of the special effect to the hair of the target object with other functions, thereby not only expanding the application range of image processing, but also increasing the use pleasure of the user and improving the user experience. Moreover, the method for processing images according to the embodiment of the present disclosure is not limited by the number of set preset directions, the prediction is more accurate and the speed is faster.

Figure 8:
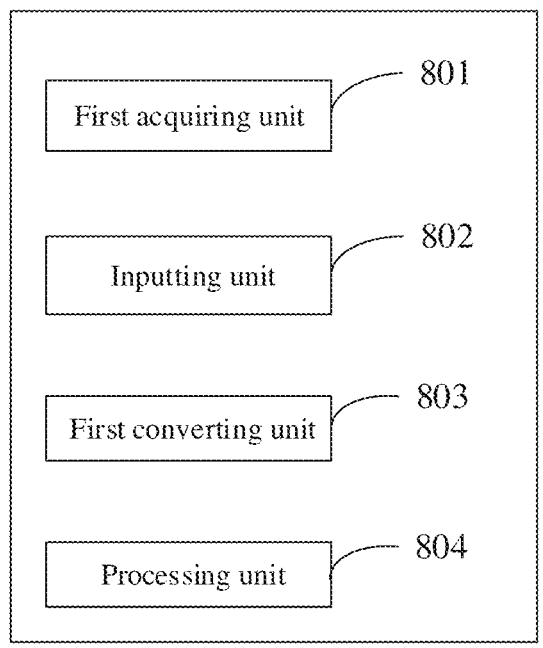
FIG. 8 is a block diagram illustrating an apparatus for processing images according to an exemplary embodiment of the present disclosure.

FIG. 8 is a block diagram illustrating an apparatus for processing images according to an exemplary embodiment.

As shown in FIG. 8, the apparatus includes: a first acquiring unit 801, configured to acquire a hair region in a first image, wherein the hair region includes a region where the hair of a target object in the first image is located; an inputting unit 802, configured to input the hair region into a hair direction prediction model and acquire a cosine value of a corresponding angle of a hair direction of each first pixel point in the hair region, wherein the hair direction of each first pixel point is characterized by an angle of hair at each first pixel point relative to a horizontal line; a first converting unit 803, configured to convert the cosine value of the corresponding angle of the hair direction of each first pixel point into the hair direction of each first pixel point; and a processing unit 804, configured to acquire a second image by image processing on the hair region in the first image based on the hair direction of each first pixel point.

The cosine value of the corresponding angle of the hair direction of the first pixel point is a hair direction parameter at the first pixel point.

In some embodiments, the inputting unit 802 is configured to determine a hair direction parameter of a pixel point in the hair region by a hair direction prediction model based on the hair region, wherein the hair direction parameter includes an angle of a hair direction of the pixel point relative to a horizontal line. The first converting unit 803 is configured to convert the hair direction parameter of the pixel point into a hair direction of the pixel point. The processing unit 804 is configured to generate the second image by processing the hair region in the first image based on the hair direction of the pixel point.

In some embodiments, the hair direction parameter is the cosine value of an angle of the hair direction of the pixel point relative to the horizontal line.

In some embodiments, the first converting unit 803 is configured to acquire an angle of the hair direction of the first pixel point by performing an inverse function operation on a cosine value of a corresponding angle of the hair direction of the first pixel point for each first pixel point, wherein the angle of the hair direction of the first pixel point characterizes the hair direction of the first pixel point.

In some embodiments, the first converting unit 803 is configured to determine the angle of the hair direction of the pixel point relative to a horizontal line based on the hair direction parameter of the pixel point, and determine the hair direction of the pixel point based on the angle.

The cosine value of a corresponding angle of the hair direction of the pixel point is the hair direction parameter at the pixel point, and the angle of the hair direction of the pixel point is the angle of the hair direction of the pixel point relative to a horizontal line.

In some embodiments, the processing unit 804 is configured to determine a direction of the hair region based on the hair direction of each first pixel point; and acquire a second image by mapping the hair region with a direction back to the first image based on the position of the hair region in the first image.

In some embodiments, the processing unit 804 is configured to determine a direction of the hair region based on the hair direction, and acquire a second image by mapping the hair region to the first image based on the position of the hair region in the first image.

In some embodiments, the first acquiring unit 801 is configured to acquire the first image, acquire an RIO by inputting the first image into a hair segmentation network, or in other words, acquire the ROI by processing the first image by calling a hair segmentation network, and acquire a hair region by clipping the ROI out from the first image.

In some embodiments, the first acquiring unit 801 is configured to acquire the first image, determine the ROI in the first image using the hair segmentation network, and acquire the hair region by segmenting the ROI from the first image.

In some embodiments, the processing unit 804 is configured to generate the second image by adding a special effect to the hair region based on the hair direction of the pixel point, wherein the special effect is used for changing the hair direction.

In some embodiments, the special effect changes with the hair of the target object in the case that the hair of the target object changes with the head of the target object.

In some embodiments, the first acquiring unit 801 is configured to: acquire the hair region in the first image in response to detecting that the hair of the target object is unwound; or acquire the hair region in the first image in response to entering a shooting interface after a video about the special effect is viewed; or acquire the hair region in the first image in response to receiving a trigger instruction generated when a preset virtual button is triggered.

Figure 9:
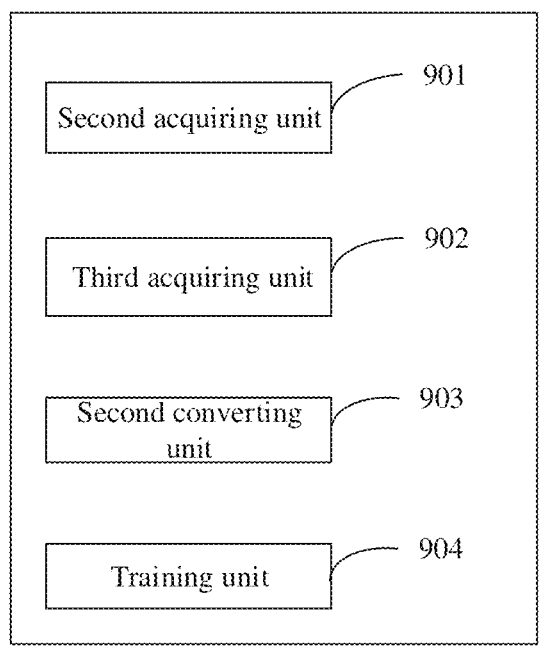
FIG. 9 is a block diagram illustrating another apparatus for processing images according to an exemplary embodiment of the present disclosure.

FIG. 9 is a block diagram illustrating an apparatus for processing images according to an exemplary embodiment of the present disclosure.

As shown in FIG. 9, the apparatus includes: a second acquiring unit 901, configured to acquire a sample hair region; a third acquiring unit 902, configured to acquire a hair direction of each second pixel point in the sample hair region; a second converting unit 903, configured to convert the hair direction of each second pixel point into a sample cosine value of a corresponding angle at each second pixel point; and a training unit 904, configured to acquire the hair direction prediction model by training a hair direction model based on the sample hair region and the sample cosine value of the corresponding angle at each second pixel point in the sample hair region.

The sample cosine value of the corresponding angle of the hair direction of the pixel point is the sample hair direction parameter at the pixel point.

In some embodiments, the third acquiring unit 902 is configured to acquire a hair direction of a pixel point in the sample hair region. The second converting unit 903 is configured to convert the hair direction of the pixel point into a sample hair direction parameter at the pixel point. The training unit 904 is configured to train the hair direction prediction model based on the sample hair region and the sample hair direction parameter of the pixel point.

In some embodiments, the third acquiring unit 902 is configured to: convert the sample hair region from a current spatial domain to a frequency domain; in the frequency domain, determine a similarity between the hair direction of the second pixel point in the sample hair region and each preset direction; and characterize the hair direction of the second pixel point by using the preset direction with a largest similarity.

In some embodiments, the third acquiring unit 902 is configured to: convert the sample hair region from a current spatial domain to a frequency domain; in the frequency domain, determine a similarity between the hair direction of the pixel point in the sample hair region and each preset direction; and determine the hair direction of the pixel point based on the preset direction with the largest similarity.

In some embodiments, the third acquiring unit 902 is configured to: acquire tag information of a labeled sample hair region; and acquire the hair direction of the second pixel point in the sample hair region from the tag information. In other words, the third acquiring unit 902 is configured to: acquire tag information of a labeled sample hair region; and acquire the hair direction of the pixel point in the sample hair region based on the tag information.

Figure 10:
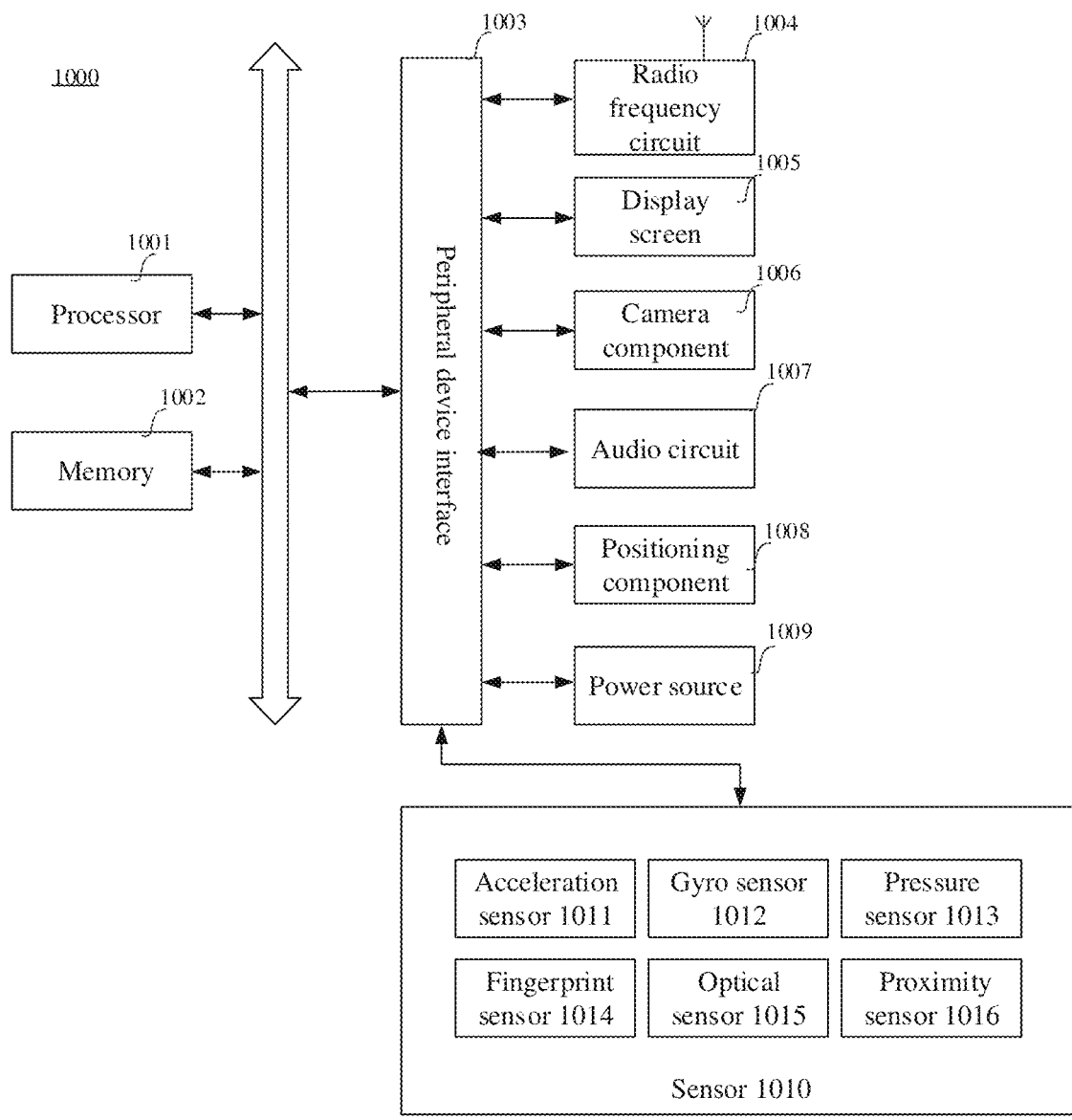
FIG. 10 is a block diagram illustrating an electronic device according to an exemplary embodiment of the present disclosure.

FIG. 10 is a block diagram illustrating an electronic device 1000 according to an exemplary embodiment. The electronic device 1000 is configured to perform the steps of the above method for processing images.

Generally, the electronic device 1000 includes a processor 1001 and a memory 1002.

The processor 1001 may include one or more processing cores, such as a 4-core processor and an 8-core processor. The processor 1001 may be implemented by at least one hardware form of a digital signal processor (DSP), a field-programmable gate array (FPGA), and a programmable logic array (PLA). The processor 1001 may also include a main processor and a coprocessor. The main processor is a processor configured to process the data in an awake state, and is also called a central processing unit (CPU). The coprocessor is a low-power-consumption processor configured to process the data in a standby state. In some embodiments, the processor 1001 may be integrated with a graphics processing unit (GPU), which is configured to render and draw the content that needs to be displayed by a display screen. In some embodiments, the processor 1001 may also include an Artificial Intelligence (AI) processor configured to process computational operations related to machine learning.

The memory 1002 may include one or more computer-readable storage media, which can be non-transitory. The memory 1002 may also include a high-speed random-access memory, as well as a non-volatile memory, such as one or more disk storage devices and flash storage devices. In some embodiments, the non-transitory computer-readable storage medium in the memory 1002 is configured to store one or more computer programs including one or more instructions. The one or more instructions, when loaded and executed by the processor 1001, cause the processor 1001 to perform the method for processing images according to the embodiments of the present disclosure.

In some embodiments, the electronic device 1000 also optionally includes a peripheral device interface 1003 and at least one peripheral device. The processor 1001, the memory 1002, and the peripheral device interface 1003 may be connected by a bus or a signal line. Each peripheral device may be connected to the peripheral device interface 1003 by a bus, a signal line or a circuit board. Specifically, the peripheral device includes at least one of a radio frequency circuit 1004, a display screen 1005, a camera component 1006, an audio circuit 1007, a positioning component 1008 and a power source 1009.

The peripheral device interface 1003 may be configured to connect at least one peripheral device associated with an input/output (I/O) to the processor 1001 and the memory 1002. In some embodiments, the processor 1001, the memory 1002 and the peripheral device interface 1003 are integrated on the same chip or circuit board. In some other embodiments, any one or two of the processor 1001, the memory 1002 and the peripheral device interface 1003 may be implemented on a separate chip or circuit board, which is not limited in the present embodiment.

The radio frequency circuit 1004 is configured to receive and transmit a radio frequency (RF) signal, which is also referred to as an electromagnetic signal. The radio frequency circuit 1004 communicates with a communication network and other communication devices via the electromagnetic signal. The radio frequency circuit 1004 converts the electrical signal into the electromagnetic signal for transmission, or converts the received electromagnetic signal into the electrical signal. Optionally, the radio frequency circuit 1004 includes an antenna system, an RF transceiver, one or more amplifiers, a tuner, an oscillator, a digital signal processor, a codec chipset, a user identity module card, and the like. The radio frequency circuit 1004 can communicate with other electronic devices via at least one wireless communication protocol. The wireless communication protocol includes, but not limited to, a metropolitan area network, various generations of mobile communication networks (2G, 3G, 4G, and 5G), a wireless local area network, and/or a wireless fidelity (Wi-Fi) network. In some embodiments, the RF circuit 1004 may also include near-field communication (NFC) related circuits, which is not limited in the present disclosure.

The display screen 1005 is configured to display a user interface (UI). The UI may include graphics, text, icons, videos, and any combination thereof. When the display screen 1005 is a touch display screen, the display screen 1005 also has the capability to acquire touch signals on or over the surface of the display screen 1005. The touch signal may be input into the processor 1001 as a control signal for processing. At this time, the display screen 1005 may also be configured to provide virtual buttons and/or virtual keyboards, which are also referred to as soft buttons and/or soft keyboards. In some embodiments, one display screen 1005 may be disposed on the front panel of the electronic device 1000. In some other embodiments, at least two display screens 1005 may be disposed respectively on different surfaces of the electronic device 1000 or in a folded design. In some other embodiments, the display screen 1005 may be a flexible display screen disposed on a bending surface or a folded face of the electronic device 1000. Moreover, the display screen 1005 may be disposed to an irregular figure such as non-rectangle, that is, an abnormal screen. The display screen 1005 may be manufactured in the material of a liquid crystal display (LCD), an organic light-emitting diode (OLED) or the like.

The camera component 1006 is configured to acquire images or videos. Optionally, the camera component 1006 includes a front camera and a rear camera. Generally, the front camera is disposed on the front panel of the electronic device, and the rear camera is disposed on the back of the electronic device. In some embodiments, at least two rear cameras are disposed, and are any one of a main camera, a depth-of-field camera, a wide-angle camera, and a telephoto camera respectively, so as to realize a background blurring function achieved by fusion of the main camera and the depth-of-field camera, panoramic shooting and VR (Virtual Reality) shooting functions achieved by fusion of the main camera and the wide-angle camera or other fusion shooting functions. In some embodiments, the camera component 1006 may also include a flashlight. The flashlight may be a mono-color temperature flashlight or a two-color temperature flashlight. The two-color temperature flashlight is a combination of a warm flashlight and a cold flashlight and can be used for light compensation at different color temperatures.

The audio circuit 1007 may include a microphone and a speaker. The microphone is configured to collect sound waves of users and environments, and convert the sound waves into electrical signals which are input into the processor 1001 for processing, or input into the RF circuit 1004 for voice communication. For the purpose of stereo acquisition or noise reduction, there may be a plurality of microphones respectively disposed at different parts of the electronic device 1000. The microphone may also be an array microphone or an omnidirectional acquisition microphone. The speaker is then configured to convert the electrical signals from the processor 1001 or the radio frequency circuit 1004 into the sound waves. The speaker may be a conventional film speaker or a piezoelectric ceramic speaker. When the speaker is the piezoelectric ceramic speaker, the electrical signal can be converted into not only human-audible sound waves but also the sound waves which are inaudible to humans for the purpose of ranging and the like. In some embodiments, the audio circuit 1007 may also include a headphone jack.

The positioning component 1008 is configured to position a current geographic location of the electronic device to implement navigation or a location-based service (LBS). The positioning component 1008 may be the United States' Global Positioning System (GPS), Russia's Global Navigation Satellite System (GLONASS), China's BeiDou Navigation Satellite System (BDS), and the European Union's Galileo.

The power source 1009 is configured to power up various components in the electronic device 1000. The power source 1009 may be alternating current, direct current, a disposable battery, or a rechargeable battery. When the power source 1009 includes the rechargeable battery, the rechargeable battery may support wired or wireless charging. The rechargeable battery may also support the fast charging technology.

In some embodiments, the electronic device 1000 also includes one or more sensors 1010. The one or more sensors 1010 include, but not limited to, an acceleration sensor 1011, a gyro sensor 1012, a pressure sensor 1013, a fingerprint sensor 1014, an optical sensor 1015 and a proximity sensor 1016.

The acceleration sensor 1011 may detect magnitudes of accelerations on three coordinate axes of a coordinate system established by the electronic device 1000. For example, the acceleration sensor 1011 may be configured to detect components of a gravitational acceleration on the three coordinate axes. The processor 1001 may control the display screen 1005 to display a user interface in a transverse view or a longitudinal view according to a gravity acceleration signal collected by the acceleration sensor 1011. The acceleration sensor 1011 may also be configured to collect motion data of a game or a user.

The gyro sensor 1012 can detect a body direction and a rotation angle of the electronic device 1000, and can cooperate with the acceleration sensor 1011 to collect a 3D motion of the user on the electronic device 1000. Based on the data acquired by the gyro sensor 1012, the processor 1001 can serve the following functions: motion sensing (such as changing the UI according to a user's tilt operation), image stabilization during shooting, game control and inertial navigation.

The pressure sensor 1013 may be disposed on a side frame of the electronic device 1000 and/or a lower layer of the display screen 1005. When the pressure sensor 1013 is disposed on the side frame of the electronic device 1000, a user holding signal to the electronic device 1000 can be detected. The processor 1001 can perform left-right hand recognition or quick operation based on the holding signal acquired by the pressure sensor 1013. When the pressure sensor 1013 is disposed on the lower layer of the display screen 1005, the processor 1001 controls an operable control on the UI according to a user pressure operation to the display screen 1005. The operable control includes at least one of a button control, a scroll bar control, an icon control and a menu control.

The fingerprint sensor 1014 is configured to acquire a user fingerprint. The processor 1001 identifies the user identity based on the fingerprint acquired by the fingerprint sensor 1014, or the fingerprint sensor 1014 identifies the user identity based on the acquired fingerprint. When the user identity is identified as trusted, the processor 1001 authorizes the user to perform related sensitive operations, such as unlocking the screen, viewing encrypted information, downloading software, paying, and changing settings. The fingerprint sensor 1014 may be disposed on the front, back, or side of the electronic device 1000. When the electronic device 1000 is provided with a physical button or a manufacturer logo, the fingerprint sensor 1014 may be integrated with the physical button or the manufacturer logo.

The optical sensor 1015 is configured to collect ambient light intensity. In one embodiment, the processor 1001 may control the display luminance of the display screen 1005 according to the ambient light intensity collected by the optical sensor 1015. Specifically, when the ambient light intensity is high, the display brightness of the display screen 1005 is increased; and when the ambient light intensity is low, the display brightness of the display screen 1005 is decreased. In another embodiment, the processor 1001 may also dynamically adjust shooting parameters of the camera component 1006 according to the ambient light intensity collected by the optical sensor 1015.

The proximity sensor 1016, also referred to as a distance sensor, is usually disposed on the front panel of the electronic device 1000. The proximity sensor 1016 is configured to determine a distance between the user and a front face of the electronic device 1000. In one embodiment, when the proximity sensor 1016 detects that the distance between the user and the front face of the electronic device 1000 becomes gradually smaller, the processor 1001 controls the display screen 1005 to switch from a screen-on state to a screen-off state. When the proximity sensor 1016 detects that the distance between the user and the front face of the electronic device 1000 gradually becomes larger, the processor 1001 controls the display screen 1005 to switch from the screen-off state to the screen-on state.

It may be understood by those skilled in the art that the structure shown in FIG. 10 does not constitute a limitation to the electronic device 1000, and may include more or less components than those illustrated, or combine some components or adopt different component arrangements.

In an exemplary embodiment, an electronic device is provided. The electronic device includes: one or more processors; and a volatile or non-volatile memory configured to store one or more computer programs including one or more instructions executable by the one or more processors; wherein the one or more computer programs, when loaded and run by the one or more processors, cause the one or more processors to execute instructions for:

acquiring a hair region in a first image, wherein the hair region includes a region where the hair of a target object in the first image is located; determining a hair direction parameter of a pixel point in the hair region by a hair direction prediction model based on the hair region, wherein the hair direction parameter includes an angle of a hair direction of the pixel point relative to a horizontal line; converting the hair direction parameter of the pixel point into the hair direction of the pixel point; and generating a second image by processing the hair region in the first image based on the hair direction of the pixel point.

In some embodiments, the hair direction parameter is a cosine value of the angle of the hair direction of the pixel point relative to the horizontal line.

In some embodiments, the one or more computer programs, when loaded and run by the one or more processors, cause the one or more processors to execute instructions for: determining the angle of the hair direction of the pixel point relative to the horizontal line based on the hair direction parameter of the pixel point; and determining the hair direction of the pixel point based on the angle.

In some embodiments, the one or more computer programs, when loaded and run by the one or more processors, cause the one or more processors to execute instructions for: determining a direction of the hair region based on the hair direction; and generating the second image by mapping the hair region to the first image based on a position of the hair region in the first image.

In some embodiments, the one or more computer programs, when loaded and run by the one or more processors, cause the one or more processors to execute instructions for: acquiring the first image; determining an ROI in the first image using a hair segmentation network; and acquiring the hair region by segmenting the ROI from the first image.

In some embodiments, the one or more computer programs, when loaded and run by the one or more processors, cause the one or more processors to execute an instruction for: generating the second image by adding a special effect to the hair region based on the hair direction of the pixel point.

In some embodiments, the special effect changes with the hair of the target object in the case that the hair of the target object changes with the head of the target object.

In some embodiments, the one or more computer programs, when loaded and run by the one or more processors, cause the one or more processors to execute an instruction for: acquiring the hair region in the first image in response to detecting that the hair of the target object is unwound; or acquiring the hair region in the first image in response to entering a shooting interface after a video about the special effect is viewed; or acquiring the hair region in the first image in response to receiving a trigger instruction generated when a preset virtual button is triggered.

In an exemplary embodiment, an electronic device is further provided, wherein the electronic device includes: one or more processors; and a volatile or non-volatile memory configured to store one or more computer programs including one or more instructions executable by the one or more processors; wherein the one or more computer programs, when loaded and run by the one or more processors, cause the one or more processors to execute instructions for:

acquiring a sample hair region; acquiring a hair direction of a pixel point in the sample hair region; converting the hair direction of the pixel point into a sample hair direction parameter of the pixel point; and training a hair direction prediction model based on the sample hair region and the sample hair direction parameter of the pixel point.

In some embodiments, the one or more computer programs, when loaded and run by the one or more processors, cause the one or more processors to execute instructions for: converting the sample hair region from a current spatial domain to a frequency domain; in the frequency domain, determining a similarity between the hair direction of the pixel point in the sample hair region and each preset direction; and determining the hair direction of the pixel point based on the preset direction with a largest similarity.

In some embodiments, the one or more computer programs, when loaded and run by the one or more processors, cause the one or more processors to execute instructions for: acquiring tag information of a labeled sample hair region; and acquiring the hair direction of the pixel point in the sample hair region based on the tag information.

In an exemplary embodiment, a non-transitory computer-readable storage medium is further provided, wherein the computer-readable storage medium stores one or more computer programs including one or more instructions therein. The one or more computer programs, when loaded and run by one or more processors of an electronic device, cause the electronic device to execute instructions for:

acquiring a hair region in a first image, wherein the hair region includes a region where the hair of a target object in the first image is located; determining a hair direction parameter of a pixel point in the hair region by a hair direction prediction model based on the hair region, wherein the hair direction parameter includes an angle of a hair direction of the pixel point relative to a horizontal line; converting the hair direction parameter of the pixel point into the hair direction of the pixel point; and generating a second image by processing the hair region in the first image based on the hair direction of the pixel point.

In some embodiments, the hair direction parameter is a cosine value of the angle of the hair direction of the pixel point relative to the horizontal line.

In some embodiments, the one or more computer programs, when loaded and run by the one or more processors of the electronic device, cause the electronic device to execute instructions for: determining the angle of the hair direction of the pixel point relative to the horizontal line based on the hair direction parameter of the pixel point; and determining the hair direction of the pixel point based on the angle.

In some embodiments, the one or more computer programs, when loaded and run by the one or more processors of the electronic device, cause the electronic device to execute instructions for: determining a direction of the hair region based on the hair direction; and generating the second image by mapping the hair region to the first image based on a position of the hair region in the first image.

In some embodiments, the one or more computer programs, when loaded and run by the one or more processors of the electronic device, cause the electronic device to execute instructions for: acquiring the first image; determining an ROI in the first image using a hair segmentation network; and acquiring the hair region by segmenting the ROI from the first image.

In some embodiments, the one or more computer programs, when loaded and run by the one or more processors of the electronic device, cause the electronic device to execute an instruction for: generating the second image by adding a special effect to the hair region based on the hair direction of the pixel point, wherein the special effect is used for changing the hair direction.

In some embodiments, the special effect changes with the hair of the target object in the case that the hair of the target object changes with the head of the target object.

In some embodiments, the one or more computer programs, when loaded and run by a processor of an electronic device, cause the electronic device to execute an instruction for: acquiring the hair region in the first image in response to detecting that the hair of the target object is loose; or acquiring the hair region in the first image in response to entering a shooting interface after a video about the special effect is viewed; or acquiring the hair region in the first image in response to receiving a trigger instruction generated when a preset virtual button is triggered.

In an exemplary embodiment, a non-transitory computer-readable storage medium is further provided, wherein the computer-readable storage medium stores one or more computer programs including one or more instructions therein. The one or more computer programs, when loaded and run by one or more processors of an electronic device, cause the electronic device to execute instructions for:

acquiring a sample hair region; acquiring a hair direction of a pixel point in the sample hair region; converting the hair direction of the pixel point into a sample hair direction parameter of the pixel point; and training a hair direction prediction model based on the sample hair region and the sample hair direction parameter of the pixel point.

In some embodiments, the one or more computer programs, when loaded and run by the one or more processors of the electronic device, cause the electronic device to execute instructions for: converting the sample hair region from a current spatial domain to a frequency domain; in the frequency domain, determining a similarity between the hair direction of the pixel point in the sample hair region and each preset direction; and determining the hair direction of the pixel point based on the preset direction with a largest similarity.

In some embodiments, the one or more computer programs, when loaded and run by the one or more processors of the electronic device, cause the electronic device to execute instructions for: acquiring tag information of a labeled sample hair region; and acquiring the hair direction of the pixel point in the sample hair region based on the tag information.

In an exemplary embodiment, an application is further provided, wherein the application stores one or more instructions therein. The one or more instructions, when loaded and executed by one or more processors of an electronic device, cause the electronic device to perform the method for processing images according to the above aspects.

Other embodiments of the present disclosure are apparent to those skilled in the art from consideration of the specification and practice of the present disclosure. The present disclosure is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure being indicated by the following claims.

It should be appreciated that the present disclosure is not limited to the exact structure that has been described above and illustrated in the accompanying drawings, and that various modifications and changes can be made without departing from the scope thereof. It is intended that the scope of the present disclosure only be limited by the appended claims.

What is claimed is:

1. A method for processing images, applicable to an electronic device, the method comprising:
   acquiring a hair region in a first image, wherein the hair region comprises a region where hair of a target object in the first image is located;
   determining a hair direction parameter of a pixel point in the hair region by a hair direction prediction model based on the hair region, wherein the hair direction parameter indicates an angle of a hair direction of the pixel point relative to a horizontal line;
   converting the hair direction parameter of the pixel point into the hair direction of the pixel point; and generating a second image by processing the hair region based on the hair direction.

2. The method according to claim 1, wherein the hair direction parameter is a cosine value of the angle of the hair direction relative to the horizontal line.

3. The method according to claim 1, wherein converting the hair direction parameter of the pixel point into the hair direction of the pixel point comprises:
determining the angle of the hair direction relative to the horizontal line based on the hair direction parameter; and
determining the hair direction of the pixel point based on the angle.

4. The method according to claim 1, wherein generating the second image by processing the hair region in the first image based on the hair direction of the pixel point comprises:
determining a direction of the hair region based on the hair direction; and
generating the second image by mapping the hair region to the first image based on a position of the hair region in the first image.

5. The method according to claim 1, wherein acquiring the hair region in the first image comprises:
acquiring the first image;
determining a region of interest (ROI) in the first image using a hair segmentation network; and
acquiring the hair region by segmenting the ROI from the first image.

6. The method according to claim 1, wherein generating the second image by processing the hair region in the first image based on the hair direction of the pixel point comprises:
generating the second image by adding a special effect to the hair region based on the hair direction, wherein the special effect is used for changing the hair direction.

7. The method according to claim 6, wherein the special effect changes with the hair of the target object in the case that the hair of the target object changes with a head of the target object.

8. The method according to claim 1, wherein acquiring the hair region in the first image comprises:
acquiring the hair region in the first image in response to detecting that the hair of the target object is unwound;
acquiring the hair region in the first image in response to entering a shooting interface after a video about a special effect is viewed, wherein the special effect is used for changing the hair direction; or
acquiring the hair region in the first image in response to receiving a trigger instruction generated in the case that a preset virtual button is triggered.

9. A method for training a hair direction prediction model, comprising:
acquiring a sample hair region;
acquiring a hair direction of a pixel point in the sample hair region;
converting the hair direction of the pixel point into a sample hair direction parameter of the pixel point, wherein the sample hair direction parameter of the pixel point indicates an angle of the hair direction of the pixel point relative to a horizontal line; and
training the hair direction prediction model based on the sample hair region and the sample hair direction parameter of the pixel point.

10. The method according to claim 9, wherein acquiring the hair direction of the pixel point in the sample hair region comprises:

converting the sample hair region from a current spatial domain to a frequency domain;
in the frequency domain, determining a similarity between the hair direction of the pixel point in the sample hair region and each preset direction; and
determining the hair direction of the pixel point based on the preset direction with a largest similarity.

11. The method according to claim 9, wherein acquiring the hair direction of the pixel point in the sample hair region comprises:
acquiring tag information of a labeled sample hair region; and
acquiring the hair direction of the pixel point in the sample hair region based on the tag information.

12. An electronic device comprising:
one or more processors; and
a volatile or non-volatile memory configured to store one or more computer programs comprising one or more instructions executable by the one or more processors,
wherein the one or more instructions, when loaded and executed by the one or more processors, cause the one or more processors to perform a method comprising:
acquiring a hair region in a first image, wherein the hair region comprises a region where hair of a target object in the first image is located;
determining a hair direction parameter of a pixel point in the hair region by a hair direction prediction model based on the hair region, wherein the hair direction parameter indicates an angle of a hair direction of the pixel point relative to a horizontal line;
converting the hair direction parameter of the pixel point into the hair direction of the pixel point; and
generating a second image by processing the hair region in the first image based on the hair direction of the pixel point.

13. The electronic device according to claim 12, wherein the hair direction parameter is a cosine value of the angle of the hair direction of the pixel point relative to the horizontal line.

14. The electronic device according to claim 12, wherein converting the hair direction parameter of the pixel point into the hair direction of the pixel point comprises:
determining the angle of the hair direction of the pixel point relative to the horizontal line based on the hair direction parameter of the pixel point; and
determining the hair direction of the pixel point based on the angle.

15. The electronic device according to claim 12, wherein generating the second image by processing the hair region in the first image based on the hair direction of the pixel point comprises:
determining a direction of the hair region based on the hair direction; and
generating the second image by mapping the hair region to the first image based on a position of the hair region in the first image.

16. The electronic device according to claim 12, wherein acquiring the hair region in the first image comprises:
acquiring the first image;
determining a region of interest (ROI) in the first image using a hair segmentation network; and
acquiring the hair region by segmenting the ROI from the first image.

17. The electronic device according to claim 12, wherein generating the second image by processing the hair region in the first image based on the hair direction of the pixel point comprises:
- generating the second image by adding a special effect to the hair region based on the hair direction of the pixel point, wherein the special effect is used for changing the hair direction.

18. The electronic device according to claim 17, wherein the special effect changes with the hair of the target object in the case that the hair of the target object changes with a head of the target object.

19. The electronic device according to claim 12, wherein acquiring the hair region in the first image comprises:
- acquiring the hair region in the first image in response to detecting that the hair of the target object is unwound; or
- acquiring the hair region in the first image in response to entering a shooting interface after a video about a special effect is viewed, wherein the special effect is used for changing the hair direction; or
- acquiring the hair region in the first image in response to receiving a trigger instruction generated in the case that a preset virtual button is triggered.

\* \* \* \* \*